(12) United States Patent
Lord

(10) Patent No.: US 6,336,473 B1
(45) Date of Patent: Jan. 8, 2002

(54) KINK RESISTANT LIGHT WEIGHT, THIN WALLED HOSE

(75) Inventor: Dave Lord, Compton (CA)

(73) Assignee: Niedner Ltd., Coaticook Quebec (CA)

( * ) Notice: Subject to any disclaimer, the term of this patent is extended or adjusted under 35 U.S.C. 154(b) by 0 days.

(21) Appl. No.: 09/575,565

(22) Filed: May 22, 2000

Related U.S. Application Data

(60) Provisional application No. 60/135,654, filed on May 24, 1999.

(51) Int. Cl.$^7$ ................................................. F16L 11/08
(52) U.S. Cl. ........................ 138/125; 138/126; 138/141; 138/137
(58) Field of Search ................................ 138/123, 125, 138/126, 137, 140, 141

(56) References Cited

U.S. PATENT DOCUMENTS

| | | | | |
|---|---|---|---|---|
| 1,978,211 A | * | 10/1934 | Loughead | 137/90 |
| 2,515,929 A | * | 7/1950 | Ofeldt | 158/36.3 |
| 3,287,315 A | * | 11/1966 | Connor et al. | 260/45.7 |
| 3,725,167 A | * | 4/1973 | Love et al. | 156/143 |
| 3,750,712 A | * | 8/1973 | Brand | 138/124 |
| 4,111,237 A | * | 9/1978 | Mutzner et al. | 138/126 X |
| 4,431,031 A | * | 2/1984 | Ettlinger | 138/126 X |
| 5,372,163 A | * | 12/1994 | Kokuryu et al. | 138/126 |
| 5,445,191 A | * | 8/1995 | Green et al. | 138/126 |

* cited by examiner

*Primary Examiner*—Patrick Brinson
(74) *Attorney, Agent, or Firm*—Darby & Darby

(57) ABSTRACT

The present invention provides for a light weight, thin walled hose which is rigid enough to resist kinking at low pressures. The hose includes a generally circular woven inner jacket reinforcement layer; an extruded inner tubing bonded to the inner surface of the inner jacket; a circular woven outer jacket reinforcement layer; and an intermediate tubing bonded to the inner surface of the outer jacket and located between the inner and outer jackets. The intermediate tubing adds thickness to the overall wall of the hose, and stiffens the outer jacket sufficiently so that it resists kinking.

11 Claims, 2 Drawing Sheets

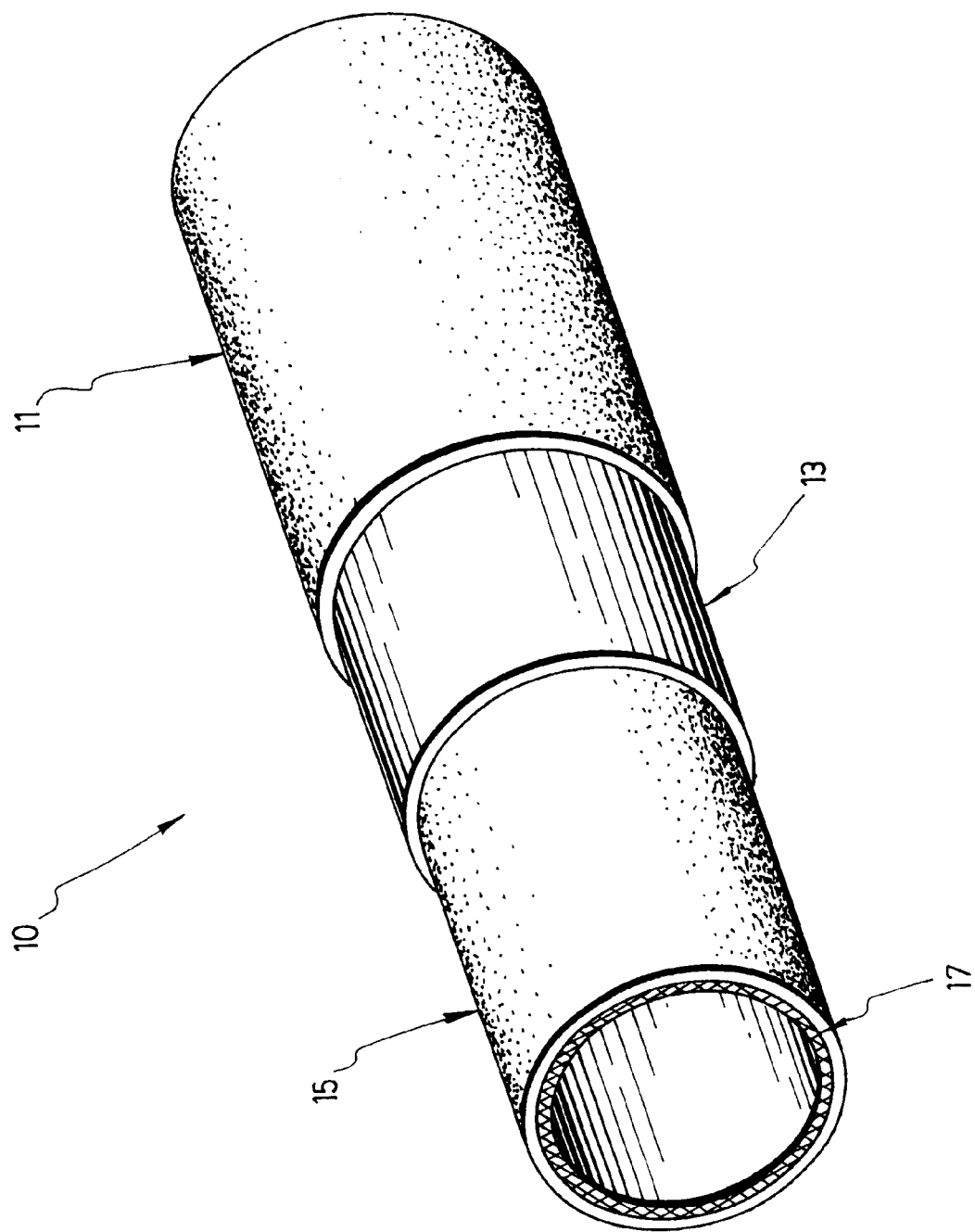

KINK RESISTANT LIGHT WEIGHT, THIN WALLED HOSE

This patent application claims the priority of U.S. provisional patent application No. 60/135,654 filed May 24, 1999, which is incorporated herein by reference.

FIELD OF THE INVENTION

The present invention relates to a kink resistant light weight, thin walled hose.

DESCRIPTION OF THE PRIOR ART

For several years now, nozzle manufacturers have been producing so-called "low pressure nozzles". These nozzles are intended to flow large amounts of water at low pressures and hence reduce fire fighter fatigue, among other things. A side effect of these nozzles is that the current light weight, thin walled hoses that are presently on the market tend to kink directly behind the nozzleman and reduce the flow of water. This problem has only come to light in the last few years and has been of particular concern to many more fire departments very recently. Older style hoses that are bulky and stiff do not exhibit this tendency but are, for obvious reasons, undesirable due to their weight and bulk.

There thus exists a need for a hose that retains all of the desirable features of a light weight, thin walled hose, but at the same time is rigid enough at low pressures to reduce kinking.

SUMMARY OF THE INVENTION

An object of the present invention is to obviate the above-noted defects in the prior art. In accordance with the invention, this object is achieved with a kink resistant, low weight, thin walled hose comprising:

a circular woven inner jacket reinforcement;

an extruded inner tubing bonded to the inner surface of the inner jacket;

a circular woven outer jacket reinforcement; and an extruded polyurethane tubing bonded to the inner surface of the outer jacket and located between the inner and outer jackets.

BRIEF DESCRIPTION OF THE DRAWINGS

The present invention and its advantages will be more easily understood after reading the following non-restrictive description of preferred embodiments thereof, made with reference to the following drawings in which:

FIG. 1 is a schematic representation of the kink resistant, light weight, thin walled hose according to the invention.

DESCRIPTION OF A PREFERRED EMBODIMENT OF THE INVENTION

Figure 2A:
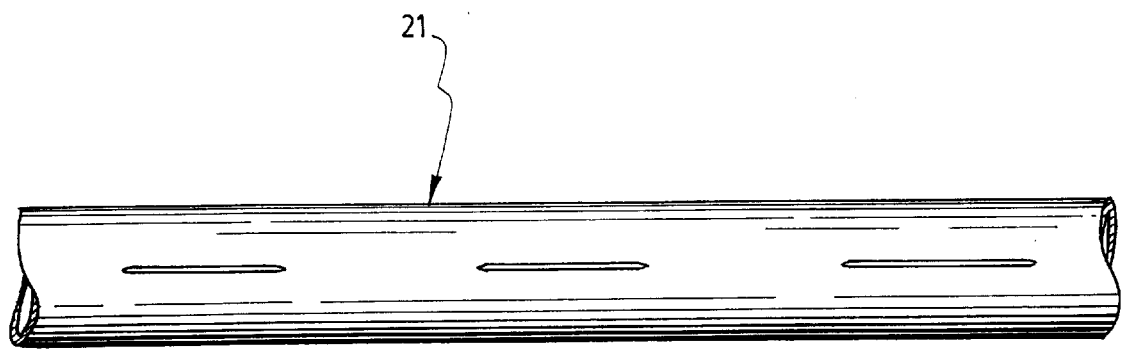
FIGS. 2a and 2b are schematic perspective and cross-sectional views, respectively, of the slits in the outer jacket liner, according to a preferred embodiment of the invention.
Figure 2B:
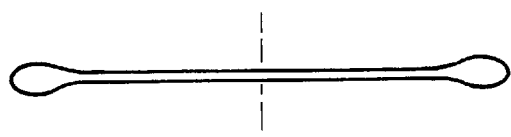

Referring now to FIG. 1, the present invention concerns a standard light weight, thin walled hose 10 which is rigid enough at low pressures to reduce kinking.

The hose 10 of the present invention includes a circular woven inner jacket reinforcement 15 having bonded thereto on its inner surface an extruded inner tubing 17. The standard light weight, thin walled hose also includes a circular woven outer jacket reinforcement 11. Woven inner jacket 15 and woven outer jacket 11 are typically made of polyester, but can also be made of any other textile fibre. It should also be understood that non-woven materials, such as plastic or rubber, have been used for such hoses, but do not give optimal results; however, use of these materials falls within the scope of the present invention.

Extruded inner tubing 17 is preferably made of EPDM rubber, but could be made of any suitable extruded polymer, and has a thickness in the range of 0.012 inches to 0.025 inches. This range permits more or less pressure loss depending on the weight that is acceptable.

The invention provides for an intermediate tubing 13, which is preferably an extruded polyurethane tubing, but could be any other extruded polymer, bonded to the inner surface of the outer jacket 11. This extruded tubing 13 adds thickness to the overall wall of the hose 10 and, more importantly, stiffens the outer jacket 11 sufficiently to resist kinking. The effect of this combination yields a hose 10 which not only resists kinking, but does it better than a conventional hose 10 of much greater weight and bulk. Intermediate tubing 13 preferably has a thickness in the range of 0.012 inches to 0.020 inches, for the following reasons. This thickness range will allow for varied degrees of stiffness. An added benefit to the intermediate tubing is that it reinforces the outer jacket 11 yarns and dramatically increases the abrasion resistance of the hose 10.

This tubing 13 can be permeable, but is more preferably impermeable. When such is the case, air might be trapped between the outer 11 and inner jackets 15. Consequently, when the hose 10 is rolled, it will tend to have a greater bulk than anticipated. Accordingly, in order to obviate this problem, the tubing 13 is preferably provided with longitudinal slits 21 prior to bonding to the outer jacket 11. These slits are preferably approximately 1 inch in length, and pass through both walls of the tubing 13 along the center line of the tubing 13. This is preferably done when the tubing 13 is in a flat condition. When the tubing 13 is bonded or vulcanized to the outer jacket 11 by steam and pressure, the slits elongate and widen to form paths for any subsequent trapped air to escape. It should be apparent however that other means to permit the trapped air to escape fall within the scope of the invention, such as holes pricked in the tubing 13.

It should further be understood that, other than the provision of the slits, the process for manufacturing the hose of the invention is accomplished using standard and well-known techniques.

Although the present invention has been explained hereinabove by way of a preferred embodiment thereof, it should be pointed out that any modifications to this preferred embodiment within the scope of the appended claims is not deemed to alter of change the nature and scope of the present invention.

What is claimed is:

1. A kink resistant, low weight, thin walled hose comprising:

a generally circular inner jacket reinforcement layer;

an extruded inner tubing within said inner jacket and bonded to the inner surface of the inner jacket;

a generally circular outer jacket reinforcement layer; and an intermediate tubing located between the inner and outer jackets and bonded only to the inner surface of the outer jacket.

2. A hose according to claim 1, wherein said intermediate tubing is an extruded polyurethane tubing.

3. A hose according to claim 2, wherein said intermediate tubing is vulcanized to said inner surface of the outer jacket.

4. A hose according to claim 2, wherein said intermediate tubing is impermeable.

5. A hose according to claim 4, wherein said intermediate tubing is provided with a plurality of longitudinal slits, to permit air trapped between the inner and outer jackets to escape.

6. A hose according to claim 1, wherein said inner jacket and said outer jacket are made of polyester.

7. In a kink resistant, thin walled hose comprising:

an inner jacket reinforcement layer;

an extruded inner tubing within the inner jacket and bonded to the inner surface of the inner jacket; and an outer jacket reinforcement layer;

the improvement wherein:

said hose further comprises an intermediate tubing located between the inner and outer jackets and bonded only to the inner surface of the outer jacket.

8. A hose according to claim 6, wherein said intermediate tubing is an extruded polyurethane tubing.

9. A hose according to claim 7, wherein said extruded polyurethane tubing is vulcanized to said outer jacket.

10. A hose according to claim 6, wherein said inner tubing has a thickness between approximately 0.012 inches and approximately 0.025 inches; and said intermediate tubing has a thickness between approximately 0.012 inches and approximately 0.020 inches.

11. A hose according to claim 7, wherein said inner and outer jackets are woven, and made of polyester.

* * * * *